United States Patent [19]
Hanson et al.

[11] Patent Number: 5,864,606
[45] Date of Patent: Jan. 26, 1999

[54] TOLL FREE MESSAGE RESPONSE

[75] Inventors: Bruce L. Hanson, Little Silver; Kenneth M. Huber, Middletown, both of N.J.

[73] Assignee: AT&T Corp., Middletown, N.J.

[21] Appl. No.: 723,734

[22] Filed: Sep. 30, 1996

[51] Int. Cl.⁶ .................................................. H04M 1/64
[52] U.S. Cl. .................................. 379/88.18; 379/88.22; 379/88.26; 379/114
[58] Field of Search ............................... 379/67, 89, 88, 379/112, 114, 123, 201, 88.11, 88.12, 88.18, 88.22, 88.23, 88.24, 88.25, 88.26, 88.13; 206/387, 387.1

[56] References Cited

U.S. PATENT DOCUMENTS

| | | | |
|---|---|---|---|
| 4,790,003 | 12/1988 | Kepley et al. | 379/88 |
| 4,846,348 | 7/1989 | Smith | 206/387 |
| 5,029,200 | 7/1991 | Hass et al. | 379/89 |
| 5,177,780 | 1/1993 | Kasper et al. | 379/89 |
| 5,251,251 | 10/1993 | Barber et al. | 379/67 |
| 5,457,732 | 10/1995 | Goldberg | 379/89 |
| 5,661,782 | 8/1997 | Bartholomew et al. | 379/216 |
| 5,662,222 | 9/1997 | Thayer et al. | 206/387.1 |
| 5,703,937 | 12/1997 | Saltzman | 379/88 |

*Primary Examiner*—Daniel S. Hunter

[57] ABSTRACT

A message and billing system and method is provided for transmitting a reply message over a communications network from a called party's message service system to a calling party's message service system. Prior to transmitting a message to a called party, a calling party's message service system prompts the calling party to specify whether a prepaid reply is authorized. Based upon the calling party's response to the prompt, the calling party's message service system generates a message file associated with the message, which includes a prepaid reply field indicating whether a prepaid reply was authorized by the calling party. The message file is transmitted over a communications network to the called party's message service system and the called party's message service system identifies whether a prepaid reply had been authorized by the calling party based upon the prepaid reply field of the message file. Upon the called party's transmission of a reply message to the calling party's original message, the called party's message service system generates a reply message detail record having a prepaid reply field indicating whether the calling party had authorized a prepaid reply. When the prepaid reply field of the reply message detail record indicates that the calling party authorized a prepaid reply, the calling party is charged a fee for the transmission of the reply message. Alternatively, when the prepaid reply field of the reply message detail record indicates that the calling party had not authorized a prepaid reply, the called party is charged a fee for the transmission of the reply message.

35 Claims, 5 Drawing Sheets

TOLL FREE MESSAGE RESPONSE

BACKGROUND OF THE INVENTION

1. Field of the Invention

The present invention relates to communication systems and, more particularly, to a message system and method for providing a recipient of an original message with the opportunity to transmit a prepaid reply to the originator of the original message.

2. Description of the Related Art

Modern communications systems, such as a telecommunication system, frequently include voice mail, which permits a calling party to leave a message for subsequent retrieval by a called party (e.g., the party to whom the message is addressed). The voice mail feature is often used when the called party does not answer an incoming call initiated by the calling party and the call is automatically redirected to the called party's voice mailbox. At this time, the calling party may leave a voice mail message for the called party, which message may be subsequently retrieved by the called party (i.e., the intended recipient) by issuance of a command or series of commands to the communications system that has stored the message for such later retrieval.

The voice mail feature is also used where both the calling and called parties have mailboxes. In this manner, the calling party may create a message in the calling party's mailbox, address the message to the called party's mailbox, and transmit the message from the calling party's mailbox to the called party's mailbox for subsequent retrieval by the called party.

The voice mail process generally involves the storage of a recorded voice message on storage equipment associated with the communication system's switching network. The called party retrieves the message at a subsequent time when the called party issues a command or series of commands through the called party's telephone station set to the storage equipment of the communications network.

In conventional voice message systems, a called party retrieving a voice mail message is generally provided with the ability to prepare a response or reply to the retrieved message and to transmit that response to the calling party who left the original message. In one type of conventional voice message system, the calling party is generally responsible for the cost associated with the placing of the call to the called party's mailbox and the called party is responsible for the cost of transmitting the reply to the calling party's mailbox. This particular type of conventional voice messaging system is know as a "sender paid" system where each party is responsible for the cost of transmitting a voice mail message (whether an original voice mail message or a reply) to the other party.

A shortcoming of conventional "sender paid" systems is that no provision is made for the calling party to leave a message in a called party's mailbox and permit the called party to transmit a prepaid reply to the message to the calling party at the calling party's expense. For example, commercial establishments may wish to transmit a message to a number of prospective customers' mailboxes and solicit replies from such customers. In conventional "sender paid" systems, however, the prospective customers may be reluctant to transmit a reply message at the customers'expense. As a result, such commercial establishments may suffer due to receiving a minimal or insufficient number of replies to the original message.

SUMMARY OF THE INVENTION

The above problems and shortcomings are solved and a technical advance is made by the method and system of the present invention, which provides a calling party transmitting an original message to a called party with the option of prepaying for a reply to the original message by the called party. In accordance with the present invention, prior to transmitting the original message to the called party, the calling party's message service system prompts the calling party to specify whether a prepaid reply is authorized. Based upon the calling party's response to the prompt, the calling party's message service system generates a message file associated with the original message which includes a prepaid reply field indicating whether a prepaid reply was authorized by the calling party.

The message file is transmitted over a communications network to the called party's message service system and the called party's message service system identifies whether a prepaid reply had been authorized by the calling party based upon the prepaid reply field of the message file. Upon transmission of a reply message by the called party to the calling party's original message, the called party's message service system generates a reply message detail record having a prepaid reply field indicating whether the calling party had authorized a prepaid reply. When the prepaid reply field of the reply message detail record indicates that the calling party authorized a prepaid reply, the calling party is charged a fee for the transmission of the reply message. Alternatively, when the prepaid reply field of the reply message detail record indicates that the calling party had not authorized a prepaid reply, the called party is charged a fee for the transmission of the reply message.

BRIEF DESCRIPTION OF THE DRAWINGS

The foregoing features and other aspects of the invention are explained in the following description taken in connection with the accompanying drawings wherein.

DETAILED DESCRIPTION

Figure 1:
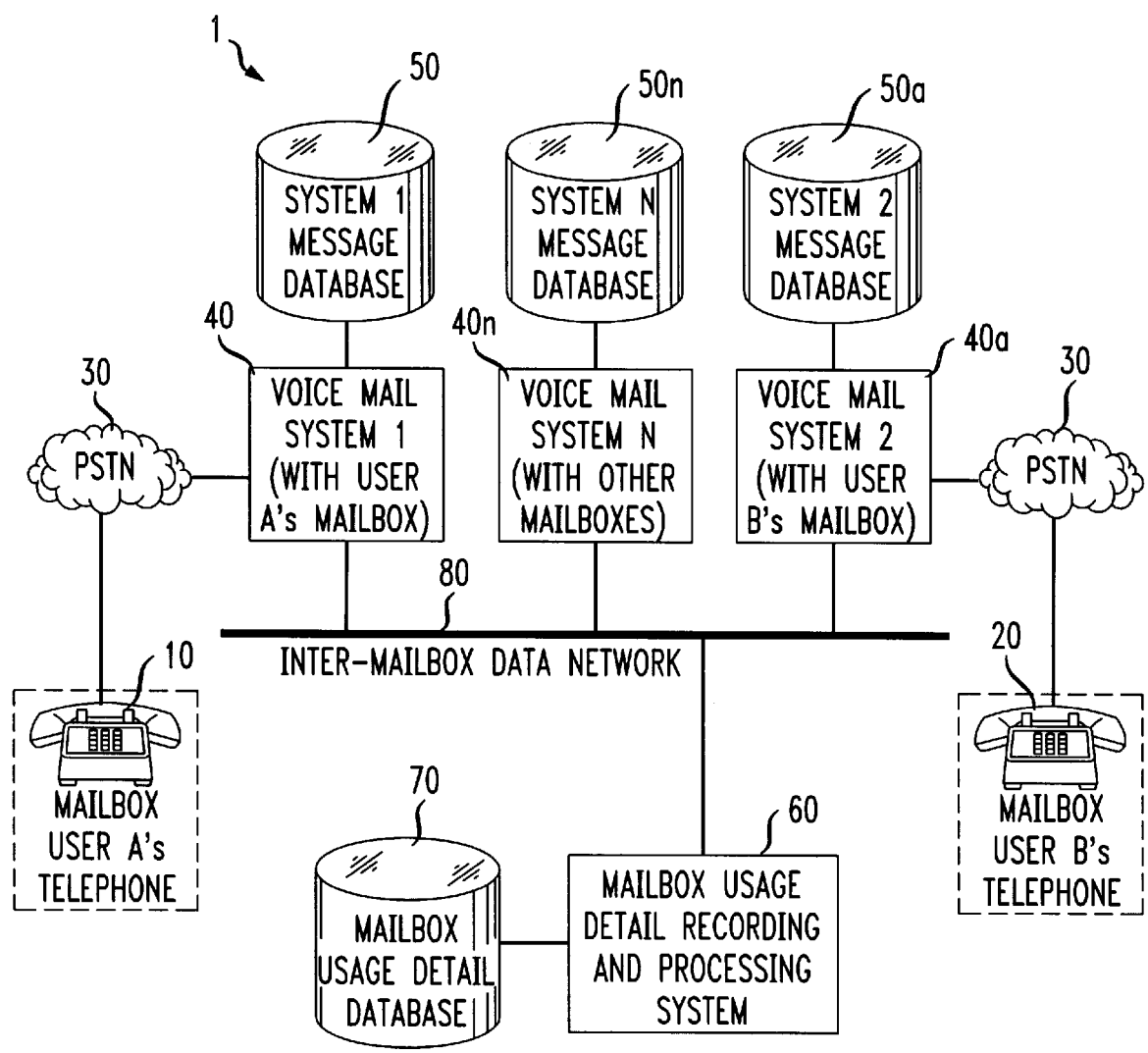
FIG. 1 is a block diagram illustrating a voice message network and billing system in accordance with the present invention.

A voice message network and billing system 1 is illustrated in FIG. 1 having at least one Voice Message System (VMS) 40. While the preferred embodiment of the present invention is described below as a voice message network having at least one VMS, the present invention is not intended to be limited to voice messaging or VMS's and is also applicable to the other messaging systems capable of transmitting or communicating data over a communications network.

Referring now to FIG. 1, the voice message network 1 is illustrated as having a number of VMS's 40, 40a, . . . 40n connected as part of the network 1. Each VMS 40, 40a, . . . 40n preferably comprises a message database 50, 50a, . . . 50n for storing system subscriber information and voice files, as well as the operating programs for the particular VMS served by the message database.

Each VMS 40, 40a, . . . 40n is preferably a computer system that essentially functions as a central answering machine for telephone subscribers. It is understood that the present invention can be utilized in a variety of VMS's or similar equipment. One well known VMS, which may be modified to perform the operations of the present invention, is an audio exchange system (AUDIX) manufactured by AT&T Corp, the assignee of the present invention. Such a VMS arrangement is described in U.S. Pat. No. 4,790,003, issued to G. D. Kepley et al. on Dec. 6, 1988, which description is incorporated herein by reference.

Referring to FIG. 1, each VMS 40, 40a, . . . 40n is connected via an inter-mailbox data network 80 to the other respective VMS's in the voice mailbox network 1. In this manner, each VMS 40, 40a, . . . 40n is able to communicate (e.g., transmit and receive information) with the other VMS's in the voice mailbox network 1.

Each VMS 40, 40a, . . . 40n is also connected via respective trunk lines to the communications network 30, which is illustrated in FIG. 1 as preferably being the public switched telephone network (PSTN). In this manner, a caller may access a particular VMS 40, 40a, . . . 40n via communications network 30 through use of a telephone station set 10, 20. It is understood that communications network 30 could also be a private branch exchange (PBX), Centrex, or similar communication or telecommunication system that controls access to the respective VMS 40, 40a, . . . 40n by telephone station sets 10, 20. It is also understood that station sets 10, 20 are not intended to be limited to telephones, but could be, for instance, conventional facsimile machines, computers, or any other device that is capable of transmitting and receiving data over a telephone line.

Each subscriber who has subscribed to the answering services offered by a service provider is assigned a "mailbox" on a storage media of a particular VMS ("called party's VMS") into which messages may be entered by a caller ("calling party") and subsequently retrieved by the called party. In addition to retrieving messages, a subscriber may access the subscriber's mailbox and create and transmit messages to another subscriber's mailbox over the inter-mailbox data network 80.

A Mailbox Usage Detail Recording and Processing System (MUDRPS) 60 is also connected to the inter-mailbox data network 80 via one or more trunk lines. The MUDRPS 60 is utilized by the service provider for billing purposes and receives message detail records generated and transmitted over the inter-mailbox data network 80 by each VMS 40, 40a, . . . 40n upon transmission of a message or other data from a subscriber's mailbox. The message detail records received by the MUDRPS 60 are stored in a Mailbox Usage Detail Database 70 connected to the MUDRPS 60. The MUDRPS 60 is essentially a computer system that periodically processes the message detail records stored in the database 70 for billing purposes that will be described in greater detail below.

Figure 4:
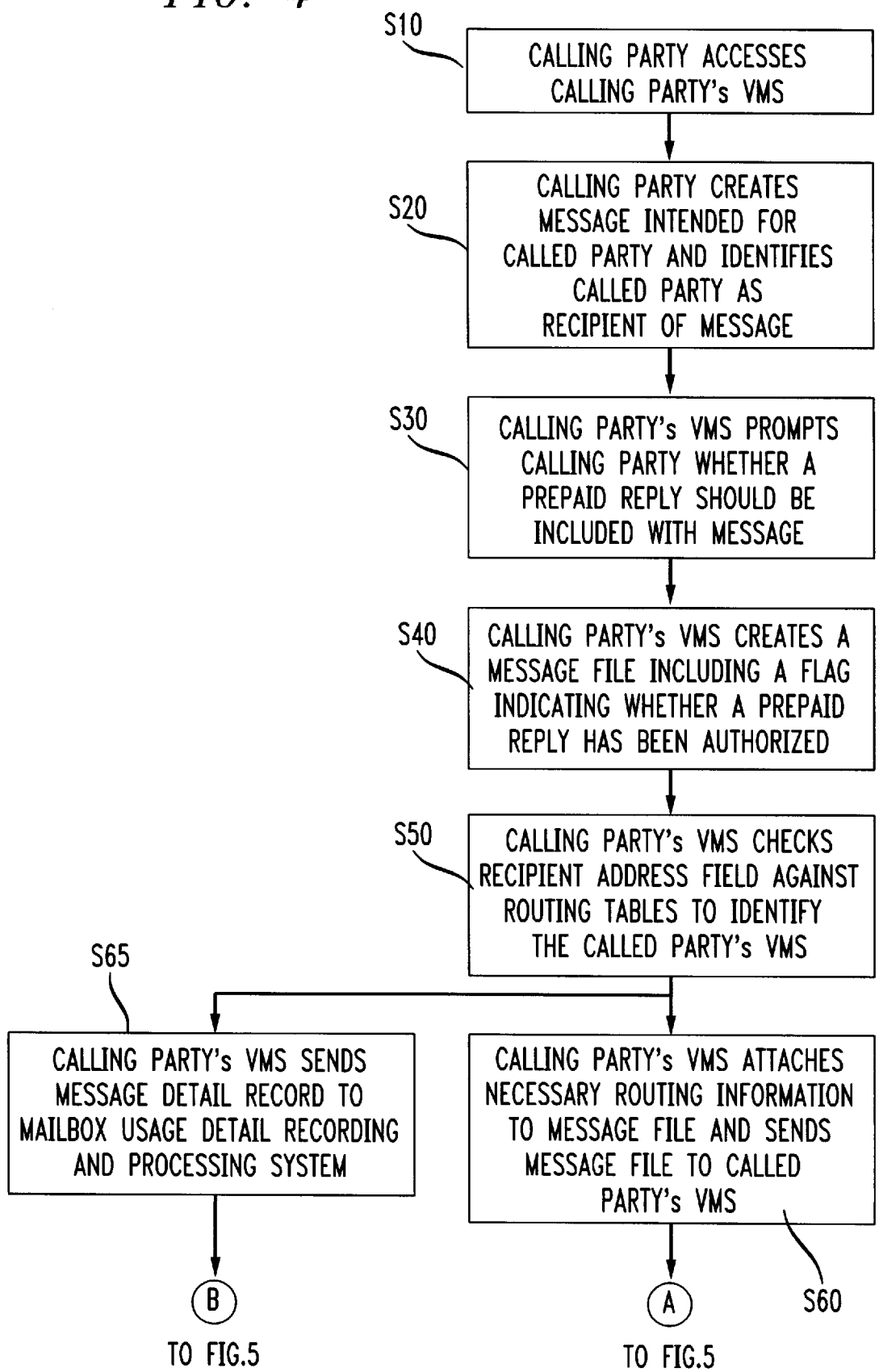
FIGS. 4–6 are flowcharts illustrating the operation of the voice message network and billing system in accordance with the present invention.
Figure 5:
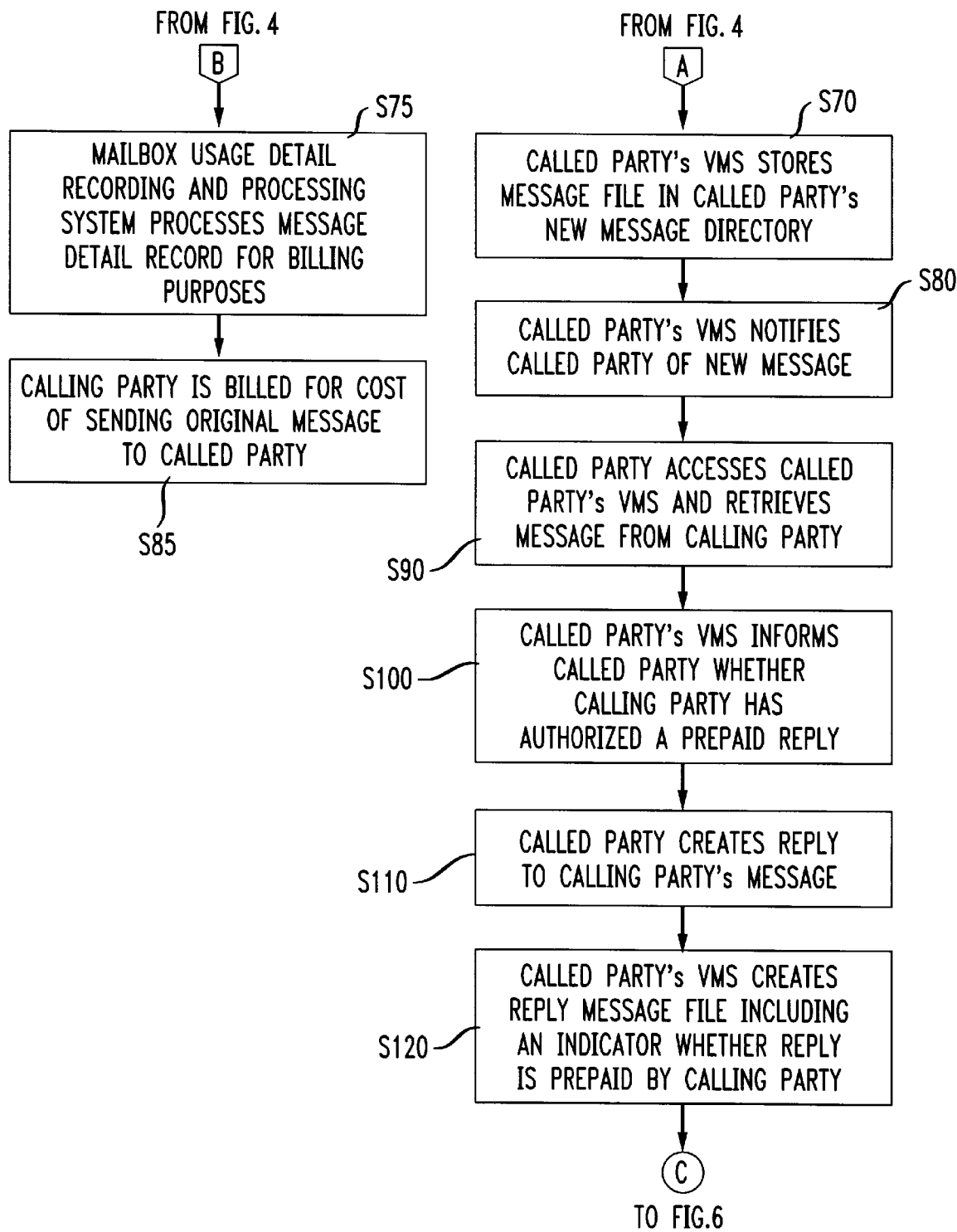
Figure 6:
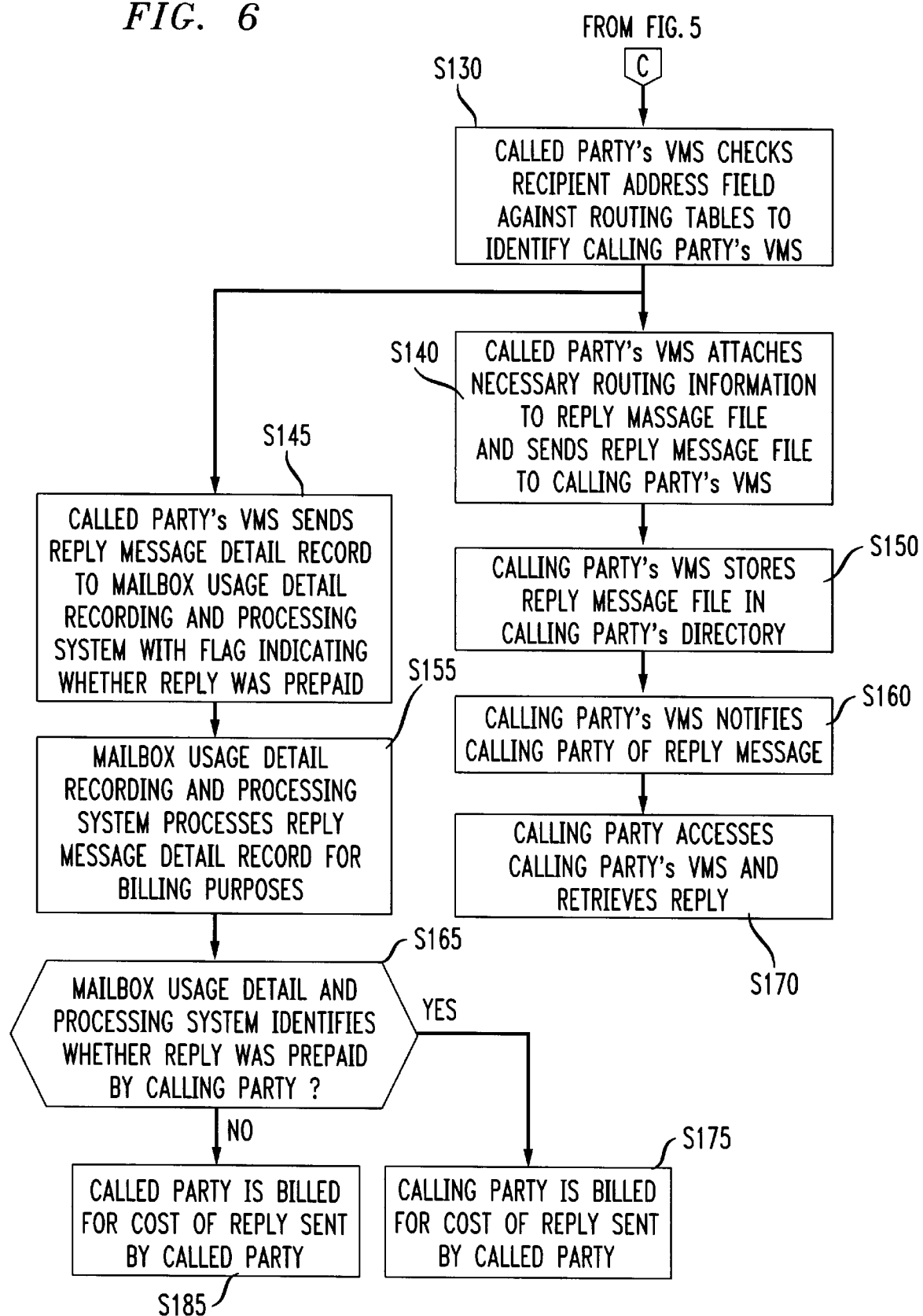

The operation of the present invention is best understood with reference to FIGS. 4–6. A calling party who desires to leave a voice mail message with another party (called party) may use telephone station set 10, for example, to dial the appropriate telephone number to access the calling party's mailbox stored, for instance, in VMS 40 (Step S10). In this example, VMS 40 will be referred to as the "calling party's VMS" because that is the location where the calling party's mailbox resides.

The calling party logs into the calling party's mailbox in a conventional manner and creates a message to send to the called party (Step S20). Creation of the message is accomplished in a conventional manner using telephone station set 10 to: (1) select the "message creation" option from the mailbox activity menu, (2) enter the information that is normally required (e.g., the mailbox identification number of the called party to whom the message is intended to be sent, as well as (optionally) priority, delivery time, etc.), and (3) record the voice message intended to be sent to the called party.

When creating a message, the calling party's VMS 40 will prompt the calling party as to whether a prepaid reply is to be included with the message being created (Step S30). The calling party will then respond to the prompt by authorizing or denying the inclusion of a prepaid reply. Preferably, the calling party will provide such a response to the prompt from the calling party's VMS 40 using the touch-tone keypad of telephone station set 10. However, it is understood that voice recognition and other conventional methods may be utilized to respond to the prepaid reply prompt from the calling party's VMS 40.

The calling party's VMS 40 thereafter creates a message file for distributing the message among the VMS's 40a . . . 40n and their respective mailboxes in the voice mailbox network 1 (Step S40). The message file created by the calling party's VMS 40 includes the necessary message address, attribute information (including a flag indicating that a prepaid reply has or has not been authorized), and audio content of the message.

Figure 2:
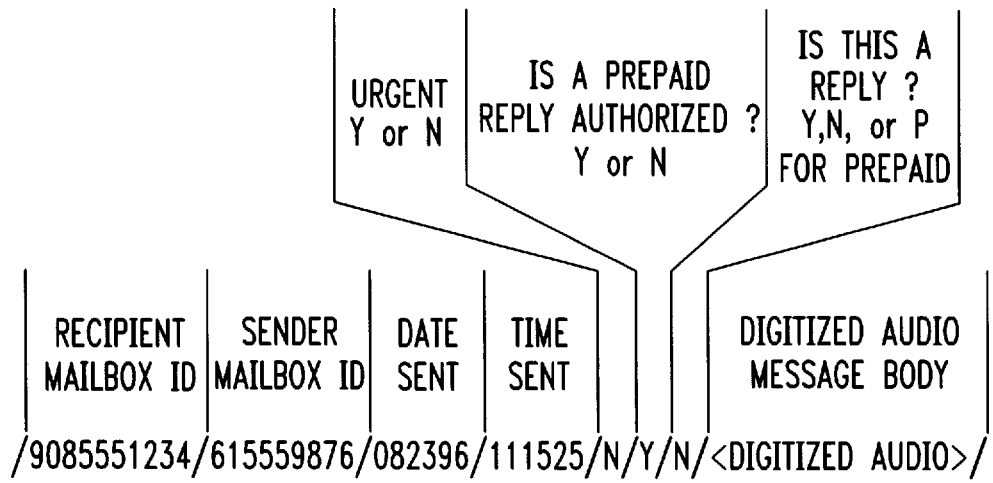
FIG. 2 is an illustrative message file for distributing messages among voice mail systems and mailboxes in accordance with the present invention.

An illustrative message file is shown in FIG. 2. In this example, the message file contains 8 discrete fields. The first field of the message file contains the recipient's (called party's) mailbox identification number ("Recipient Address field"). The second field contains the sender's (calling party's) mailbox identification number. The third and fourth fields contain the date and time that the message is sent, respectively. The fifth field of the message file contains a flag which is set by the calling party's VMS 40 to indicate whether the message being sent is urgent. The sixth field of the message file contains a flag which is set by the calling party's VMS 40 to indicate whether the calling party has authorized a prepaid reply by the recipient (called party) of the message. The seventh field of the message file contains a flag which is set by the calling party's VMS 40 to indicate whether the message being transmitted is a reply to an earlier message retrieved by the calling party. Finally, the eighth field of the message file contains the digitized audio message body of the message created by the calling party.

It is understood that the message file illustrated in FIG. 2 is for illustrative purposes only. The fields described above are simply those fields believed to be particularly useful for purposes of transmitting voice mail messages. As such, the order and number of fields in the message file are not intended to be limited to that illustrated in FIG. 2 and described above.

After the message file has been created by the calling party's VMS 40, the calling party's VMS 40 identifies the called party's VMS 40a where the recipient of the message (called party's) mailbox resides (Step S50). To identify the called party's VMS 40a, the calling party's VMS 40 checks the Recipient Address field of the message file (which contains the called party's mailbox identification number) against a routing table stored in a database of the calling party's VMS 40 and determines, for instance, that the message is to be transmitted to the called party's VMS 40a. Similar routing tables are stored in VMS 40a . . . 40n of voice mailbox network 1 as well.

Upon identifying the called party's VMS 40a, the calling party's VMS 40 attaches the necessary routing information (corresponding to the called party's VMS 40*a*) to the message file and transmits the message file over the inter-mailbox data network 80 to the called party's VMS 40*a* (Step S60).

In addition, the calling party's VMS 40 also creates a message detail record and transmits the message detail record to the MUDRPS 60 over the inter-mailbox data network 80, which message detail record is then stored in the mailbox usage detail database 70 connected to the MUDRPS 60 (Step S65). Thereafter, the MUDRPS 60 processes the message detail record (Step S75) and the calling party may be billed by the service provider for the cost of sending the message to the called party (Step S85).

Figure 3:
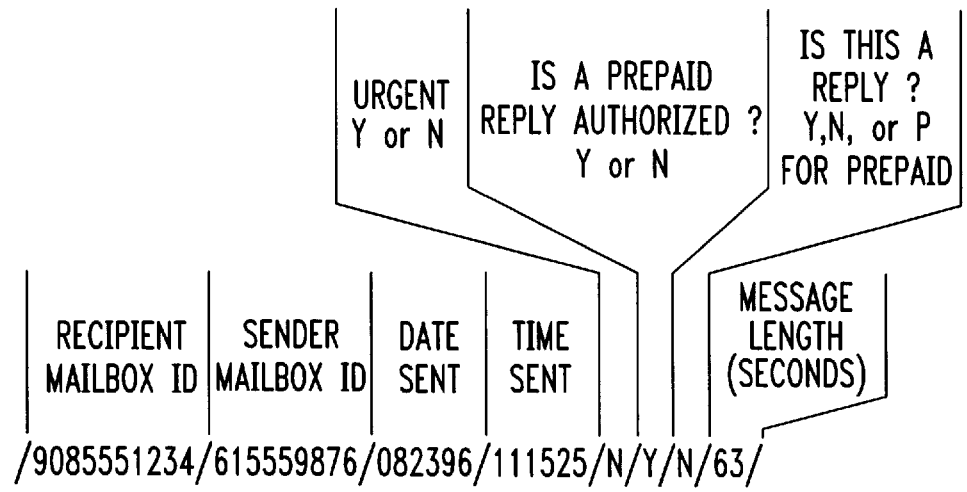
FIG. 3 is an illustrative message detail record to capture essential information for message billing and account in accordance with the present invention.

An illustrative message detail record is shown in FIG. 3. Like the message file described above, the message detail record in this example also contains 8 discrete fields. The first through seventh fields are identical to the first through seventh fields described above with respect to the message file generated by the calling party's VMS 40 (including a field indicating whether the calling party has authorized a prepaid reply). However, instead of containing a digitized audio message body field, the eighth field of the message detail record indicates the length of the message (preferably in seconds) being transmitted in order to facilitate accurate billing by the service provider.

Like the message file illustrated in FIG. 2, it is understood that the message detail record illustrated in FIG. 3 is for illustrative purposes only. The fields described above are simply those fields believed to be particularly useful for purposes of accounting and billing by the service provider for the transmission of voice mail messages within the voice mailbox network 1. As such, the order and number of fields in the message detail record are not intended to be limited to that illustrated in FIG. 3 and described above.

Upon receipt of the message file transmitted by the calling party's VMS 40, the called party's VMS 40*a* stores the message file in the called party's new message directory in the message database 50*a* connected to VMS 40*a* (Step S70). At this time, the called party's VMS 40*a* notifies the called party that a new message is waiting in the called party's mailbox (Step S80). Such notification of a new message can be accomplished in a convention manner, such as illuminating a new message indicator light on the called party's telephone station set 20.

Having been notified of a new message, the called party accesses the called party's mailbox by dialing the appropriate access number associated with the called party's VMS 40*a* (the VMS where the called party's mailbox resides) using telephone station set 20. After logging into the called party's mailbox in a conventional manner, the called party is able to retrieve and hear the message received from the calling party (Step S90). Such retrieval is accomplished in a conventional manner by selecting the "message retrieval" option from the mailbox activity menu. The called party's VMS 40*a* will play the typical audible message "header" information to the called party (e.g., who the message is from and when the message was received), as well as a special announcement advising the called party whether the calling party has authorized a prepaid reply (Step S100). The called party's VMS 40*a* identifies whether the calling party has authorized a prepaid reply message based upon the flag appearing in the "prepaid reply" field of the message file received from the calling party's VMS 40.

After listening to the message and completion of the playback, the called party's VMS 40*a* provides the called party with the menu option to reply to the message and reminds the called party whether the reply was prepaid by the calling party. Preferably, such menu options and reminders are provided to the called party in a conventional manner using audible messages that are played by the called party's VMS 40*a*.

Should the called party wish to create and transmit a reply to the calling party's message, the called party will select the "reply" option from the mailbox menu using the touch-tone keypad of telephone station set 20. However, it is understood that voice recognition and other conventional methods could be utilized to select mailbox menu options within the called party's VMS 40*a*.

After selecting the "reply" option, the called party is instructed by the called party's VMS 40*a* to record the reply message in the normal manner. The called party thereafter records the reply and approves the reply for sending to the calling party using telephone station set 20 (Step S110).

The called party's VMS 40*a* thereafter creates a reply message file for transmitting the reply message to the calling party's VMS 40 and associated mailbox (Step S120). The reply message file created by the called party's VMS 40*a* includes the recipient (calling party's) address taken from the message file of the original message that is being replied to, the called party's (e.g., party generating the reply message) identification, the audio content of the reply message, and a separate flag indicating whether the reply was prepaid by the calling party. The content of the reply message file created by the called party's VMS 40*a* is similar to that of the message file described above and illustrated in FIG. 2.

After the reply message file has been created by the called party's VMS 40*a*, the called party's VMS 40*a* identifies the calling party's VMS 40 where the recipient of the message (calling party's) mailbox resides (Step S130). To identify the calling party's VMS 40, the called party's VMS 40*a* checks the Recipient Address field of the reply message file (which contains the calling party's mailbox identification number) against a routing table stored in a database of the called party's VMS 40*a* and determines that the reply message is to be transmitted to the calling party's VMS 40.

Upon identifying the calling party's VMS 40, the called party's VMS 40*a* attaches the necessary routing information (corresponding to the calling party's VMS 40) to the reply message file and transmits the reply message file over the inter-mailbox data network 80 to the calling party's VMS 40 (Step S140).

Upon receipt of the reply message file transmitted by the called party's VMS 40*a*, the calling party's VMS 40 stores the reply message file in the calling party's message directory in the message database 50 connected to VMS 40 (Step S150). At this time, the calling party's VMS 40 notifies the calling party that the reply message is waiting in the calling party's mailbox (Step S160). Such notification of the reply message can be accomplished in a convention manner, such as by illuminating a new message indicator light on the calling party's telephone station set 10.

Having been notified of the reply message, the calling party again accesses the calling party's mailbox by dialing the appropriate access number associated with the calling party's VMS 40 (the VMS where the calling party's mailbox resides) using telephone station set 10. After logging into the calling party's mailbox in a conventional manner, the calling party is able to retrieve and hear the reply message from the called party (Step S170). Such retrieval is accomplished in a conventional manner by selecting the "message retrieval" option from the mailbox activity menu. The calling party's VMS 40 identifies whether the reply message was prepaid by the calling party based upon the flag appearing in the "prepaid reply" field of the reply message file. The calling party's VMS 40 will play the typical audible message "header" information (e.g., who the message is from and when the message was received) to the calling party and will also indicate whether the reply message from the called party was prepaid by the calling party. The calling party thereafter listens to the reply message from the called party in a conventional manner.

In addition to creating a reply message file, the called party's VMS 40a also creates a reply message detail record and transmits the reply message detail record to the MUDRPS 60 over the inter-mailbox data network 80, which record is then stored in the mailbox usage detail database 70 connected to the MUDRPS 60 (Step S145). The content of the reply message detail record created by the called party's VMS 40a is similar to that of the message detail record described above and illustrated in FIG. 3. This reply message detail record includes a flag indicating whether the reply message was prepaid by the calling party.

After receiving and storing the reply message detail record, the MUDRPS 60 thereafter processes the reply message detail record for accounting and billing purposes on behalf of the service provider (Step S155). The MUDRPS 60 identifies whether the reply message associated with the reply message detail record was prepaid by the calling party (the recipient of the reply message) based upon the flag appearing in the "reply prepaid" field of the reply message detail record (Step S165).

If the flag appearing in the "reply prepaid" field of the reply message detail record indicates that the calling party had not authorized a prepaid reply, then the called party may be billed by the service provider for the cost of transmitting the reply message to the calling party (Step S185). However, if the flag appearing in the "reply prepaid" field of the reply message detail record indicates that the calling party authorized a prepaid reply, then the calling party may be billed by the service provider for the cost of the reply message transmitted by the called party (Step S175).

Where the calling party has authorized one or more prepaid replies, the calling party may be billed by the service provider for the cost of each reply actually sent to the calling party or, alternatively, the calling party may be billed a particular fee by the service provider for each prepaid reply authorized by the calling party (irrespective of whether an actual prepaid reply was subsequently sent to the calling party in response to the calling party's message).

Furthermore, to discourage fraudulent messages authorizing prepaid replies, the MUDRPS 60 can match the reply message detail record generated by the called party's VMS 40a to the message detail record originally generated by the calling party's VMS 40. Before treating a reply message transmitted within the voice mailbox network 1 as having been prepaid, both the message detail record and reply message detail record associated with the reply message would necessarily include a flag in the "reply prepaid" field indicating that the calling party had authorized a prepaid reply. In the event that the flag in the "reply prepaid" field in the message detail record indicated that the calling party had not authorized a prepaid reply, then the authorization would be deemed potentially fraudulent and identified to the service provider for further investigation.

In accordance with the present invention, the calling party, who authorizes a prepaid reply to a message sent by the calling party, may also set a limit on the length of the prepaid reply message. This could be accomplished by creating an additional field in the message detail record generated by the called party's VMS 40. The service provider could set a default time limit on the length of the reply message and/or the calling party may instruct the calling party's VMS 40 of the desired time limit in response to a prompt from the called party's VMS following the authorization of a prepaid reply in Step S30 illustrated in FIG. 4.

Although an illustrative and advantageous embodiment has been described herein in detail, it should be noted and will be appreciated by those skilled in the art that numerous variations may be made within the scope of this invention without departing from the principle of this invention and without sacrificing its chief advantages. For instance, it is understood that the present invention is not limited to voice mail messaging, but also encompasses other modes of communication over a communication network or telephone line, such as facsimile transmissions, E-Mail transmissions, etc. In addition, although the above-described prepaid reply field contained in the various message files and detail records is preferably transmitted or communicated over the inter-mailbox data network 80, it is further understood that the prepaid reply field could similarly be generated and transmitted or communicated as a separate signal over a signalling network. As such, the terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method of transmitting a reply voice message over a voice mailbox network from a message recipient's voice message system to a message sender's voice message system, the reply message being sent in response to an original message communicated over the network from the message sender's voice message system to the message recipient's voice message system, the method comprising the steps of:

receiving a message file associated with the original message, the received message file including a prepaid reply field indicating whether a prepaid reply had been authorized by the message sender;

reading the prepaid reply field of the received message file to determine whether a prepaid reply was authorized by the message sender;

generating a reply message detail record associated with the reply message, the reply message detail record including a prepaid reply field indicating whether a prepaid reply had been authorized by the message sender;

communicating the reply message detail record from the message recipient's voice message system to a processing unit in response to communication of the reply message from the message recipient's voice message system to the message sender's voice message system;

reading the prepaid reply field of the reply message detail record;

allocating a fee to the message sender for the communication of the reply message when the prepaid reply field of the reply message detail record indicates that the message sender authorized a prepaid reply; and allocating a fee to the message recipient for the communication of the reply message when the prepaid reply field of the reply message detail record indicates that the message sender had not authorized a prepaid reply.

2. The method according to claim 1, further comprising the steps of:

prompting the message sender to specify whether a prepaid reply is authorized;

receiving a response from the message sender indicating whether a prepaid reply is authorized;

generating the message file associated with the original message at the message sender's voice message system;

indicating in the prepaid reply field of the message file whether the message sender authorized a prepaid reply; and communicating the message file from the message sender's voice message system to the message recipient's voice message system.

3. The method according to claim 1, wherein the message sender's voice message system and the message recipient's voice message system are one and the same.

4. A method of transmitting a reply message over a communications network from a called party's message service system to a calling party's message service system, the method comprising the steps of:

receiving a message file associated with an original message transmitted from the calling party's message service system to the called party's message service system, the received message file including a prepaid reply field indicating whether a prepaid reply had been authorized by the calling party;

reading the prepaid reply field of the received message file to determine whether a prepaid reply was authorized by the calling party; and generating a reply message detail record associated with the reply message, the reply message detail record including a prepaid reply field indicating whether a prepaid reply had been authorized by the calling party.

5. The method according to claim 4, further comprising the steps of:

transmitting the reply message detail record from the called party's message service system to a processing unit in response to transmission of the reply message from the called party's message service system to the calling party's message service system;

reading the prepaid reply field of the reply message detail record; and allocating a fee to the calling party for the transmission of the reply message when the prepaid reply field of the reply message detail record indicates that the calling party authorized a prepaid reply.

6. The method according to claim 5, wherein the reply message detail record is stored in a database associated with the processing system.

7. The method according to claim 5, further comprising the step of allocating a fee to the called party for the transmission of the reply message when the prepaid reply field of the reply message detail record indicates that the calling party had not authorized a prepaid reply.

8. The method according to claim 5, wherein the reply message is a voice message.

9. The method according to claim 5, wherein the reply message is a facsimile transmission.

10. The method according to claim 5, wherein the reply message is an E-Mail.

11. The method according to claim 4, further comprising the step of determining whether the calling party authorized the prepayment of a reply message in response to the original message transmitted by the calling party to the called party.

12. The method according to claim 11, further comprising the steps of:

prompting the calling party to specify whether a prepaid reply is authorized;

receiving a response from the calling party indicating whether a prepaid reply is authorized;

generating the message file associated with the original message at the calling party's message service system;

indicating in the prepaid reply field of the message file whether the calling party authorized a prepaid reply; and transmitting the message file from the calling party's message service system to the called party's message service system.

13. The method according to claim 4, further comprising the steps of:

generating a reply message file associated with the reply message, the reply message file having a prepaid reply field indicating whether a prepaid reply had been authorized by the calling party; and transmitting the reply message file from the called party's message service system to the calling party's message service system; and reading the prepaid reply field of the reply message file to determine if the reply message was prepaid by the calling party.

14. The method according to claim 4, wherein the calling party's message service system and the called party's message service system are one and the same.

15. A method of transmitting a reply message over a communications network from a called party's voice message service system to a calling party's voice message service system, the method comprising the steps of:

determining whether the calling party authorized the prepayment of a reply message in response to an original message transmitted by the calling party to the called party;

generating a reply message file associated with the reply message, the reply message file having a prepaid reply field indicating whether a prepaid reply had been authorized by the calling party; and transmitting the reply message file from the called party's voice message service system to the calling party's voice message service system.

16. The method according to claim 15, wherein the step of determining whether the calling party authorized a prepaid reply comprises the steps of:

receiving a message file associated with the original message transmitted from the calling party's voice message service system, the received message file having a prepaid reply field indicating whether a prepaid reply had been authorized by the calling party; and reading the prepaid reply field of the received message file to determine whether a prepaid reply was authorized by the calling party.

17. The method according to claim 16, further comprising the steps of:

prompting the calling party to specify whether a prepaid reply is authorized;

receiving a response from the calling party indicating whether a prepaid reply is authorized;

generating the message file associated with the original message at the calling party's voice message service system;

indicating in the prepaid reply field of the message file whether the calling party authorized a prepaid reply; and transmitting the message file from the calling party's voice message service system to the called party's voice message service system.

18. The method according to claim 16, further comprising the steps of:

generating a reply message detail record associated with the reply message, the reply message detail record having a prepaid reply field indicating whether a prepaid reply was authorized by the calling party;

transmitting the reply message detail record from the called party's voice message service system to a processing system;

reading the prepaid reply field of the reply message detail record; and allocating a fee to the calling party for the transmission of the reply message when the prepaid reply field of the reply message detail record indicates that the calling party authorized a prepaid reply.

19. The method according to claim 18, wherein the reply message detail record is stored in a database associated with the processing system.

20. The method according to claim 18, further comprising the step of allocating a fee to the called party for the transmission of the reply message when the prepaid reply field of the reply message detail record indicates that the calling party had not authorized a prepaid reply.

21. The method according to claim 17, wherein the calling party's message service system and the called party's message service system are one and the same.

22. The method according to claim 20, wherein the reply message is a voice message.

23. The method according to claim 20, wherein the reply message is a facsimile transmission.

24. The method according to claim 20, wherein the reply message may be an E-Mail.

25. A message and billing system for transmitting a reply message over a communications network from a called party's message service system to a calling party's message service system, comprising:

a data network communicatively connecting the calling party's message service system to the called party's message service system; and a processing system for processing usage detail records generated by the message service systems, the processing system communicatively connected to the message service systems via the data network;

wherein the called party's message service system is adapted to receive a message file generated by the calling party's message service system associated with an original message and transmitted over the data network from the calling party's message service system, the received message file including a prepaid reply field indicating whether a prepaid reply had been authorized by the calling party; the called party message service system being further adapted to read the prepaid reply field of the received message file to determine whether a prepaid reply was authorized by the calling party and to generate a reply message detail record associated with the reply message to the original message, the reply message detail record including a prepaid reply field indicating whether a prepaid reply had been authorized by the calling party; and the called party's message service system further adapted to transmit the reply message detail record to the processing unit in response to transmission of the reply message from the called party's message service system to the calling party's message service system.

26. The message and billing system according to claim 25, wherein the processing unit is adapted to read the prepaid reply field of the reply message detail record; and charges the calling party a fee for the transmission of the reply message when the prepaid reply field of the reply message detail record indicates that the calling party authorized a prepaid reply.

27. The method according to claim 26, wherein the calling party's message service system and the called party's message service system are one and the same.

28. A method of transmitting a reply message over an electronic communications network from a message recipient to a message sender, the reply message being sent electronically in response to an original message communicated over the network from the message sender to the message recipient, the method comprising the steps of:

furnishing to the message recipient an indication that the message sender will pay for the reply message; and transmitting the reply message to the message sender over the electronic communications network.

29. The method according to claim 28, further comprising the step of receiving authorization from the message sender that the message sender will pay for the reply message.

30. The method according to claim 28, further comprising the step of allocating the cost of communicating the reply message to the message sender.

31. The method according to claim 28, wherein the indication furnished to the message recipient is in the form of a message file associated with the original message that includes a prepaid reply field indicating whether a prepaid reply had been authorized by the message sender.

32. The method according to claim 28, wherein the reply message is a voice message.

33. The method according to claim 28, wherein the reply message is a facsimile transmission.

34. The method according to claim 28, wherein the reply message is an E-Mail.

35. The method according to claim 28, wherein the reply message is a telephone call.

* * * * *